United States Patent [19]
Iizuka et al.

[11] Patent Number: 5,393,318
[45] Date of Patent: Feb. 28, 1995

[54] METHOD OF PRODUCING ORGANIC FERTILIZER BY USING FISH AS RAW MATERIAL

[75] Inventors: Mitsuo Iizuka, Yaizu; Shigeki Konishi, Shizuoka, both of Japan

[73] Assignee: Yaizu Meal Kyogyo Kumiai, Yaizu, Japan

[21] Appl. No.: 51,565

[22] Filed: Apr. 26, 1993

[51] Int. Cl.⁶ ............................................. C05F 1/00
[52] U.S. Cl. ............................................. 71/16
[58] Field of Search ................................. 71/16

[56] References Cited
FOREIGN PATENT DOCUMENTS

| | | |
|---|---|---|
| 0180982 | 9/1985 | Japan ................................. 71/16 |
| 63-260885 | 10/1988 | Japan . |
| 4-182377 | 6/1992 | Japan . |
| 183699 | 5/1992 | Taiwan, Prov. of China . |

OTHER PUBLICATIONS

CA 94(7):46144u, Natural Fertilizer Composition Hamaoka, 1980.

Primary Examiner—Ferris Lander
Attorney, Agent, or Firm—Young & Thompson

[57] ABSTRACT

A method of producing organic fertilizer by using fish as raw material. The method comprises the steps of boiling the fish to prepare a stock, removing solids and oil contents from the stock to obtain a stock solution, thereafter treating the stock solution in a decomposition tank for enzyme decomposition, and filtering an enzyme-decomposed stock solution to form a clarified liquid. The clarified liquid can be used as a fertilizer as is or further condensed or dried into organic fertilizer without unnecessary components.

3 Claims, 1 Drawing Sheet

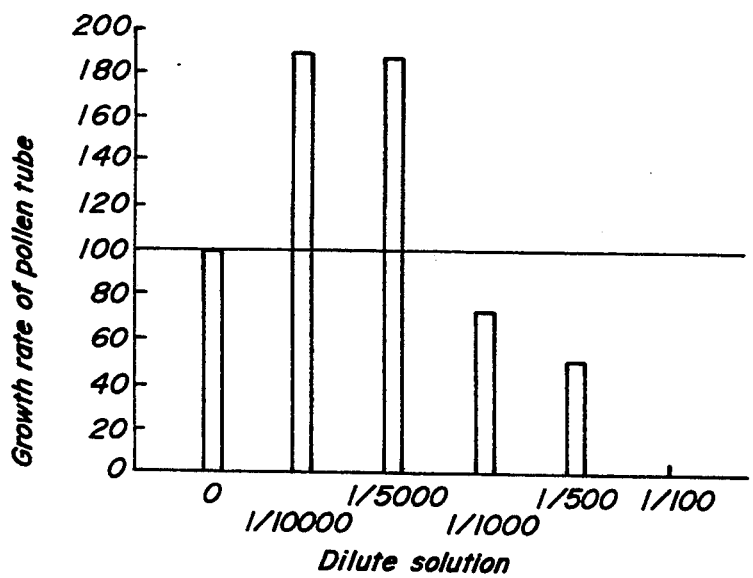
FIG_1
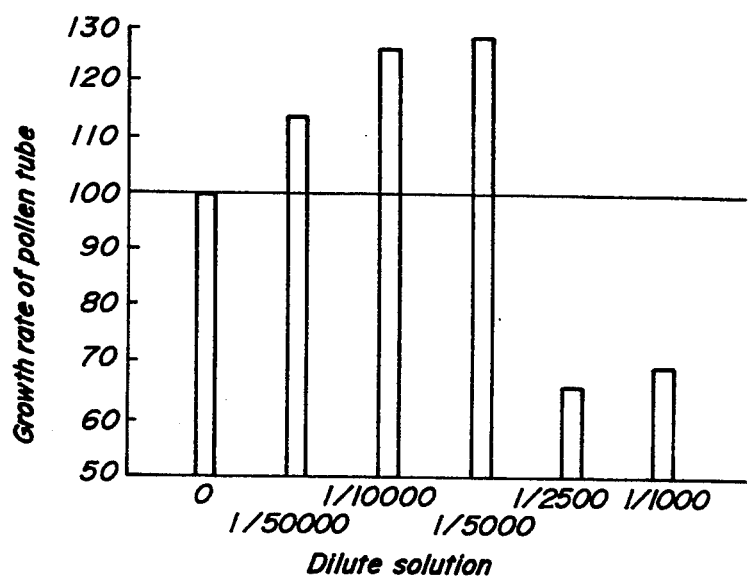
FIG_2

METHOD OF PRODUCING ORGANIC FERTILIZER BY USING FISH AS RAW MATERIAL

BACKGROUND OF THE INVENTION

The present invention relates to a method of producing an organic fertilizer by utilizing fish, particularly heads of fish such as bonitoes and others as raw material.

A fish, particularly the head of fish, contains organic nitrogen (amino acids such as lysine, asparagine, glutamine, sertine, tyrosine, proline and the like), nucleic acid, organic acid, vitamins, sugars and the like. Such effective components have delayed or immediate fertilizing effect.

However, the conventional technique has utilized a fish soluble as adsorption fertilizer, but there is no method of taking fertilizing components from the head of fish and using them as a fertilizer because the removal of unnecessary components from a stock obtained by boiling fish is very difficult to do.

There are further reasons: the head of fish such as bonito and others contains a relatively great amount of crude fat and the like preventing the fertilizing component from absorbing into a plant, and an intermediate treated liquid or stock is viscous and difficult to handle.

Hitherto, applicants invented a method for producing organic fertilizer by taking fertilizing components out of fish rather than utilizing a fish soluble as disclosed in JP-A1 No. 63-260885. In this method, the whole fish body is directly crashed and then milled by means of a crasher and a mill with supplied water and subsequently digested with enzyme in a digesting tank, thereafter treated by means of separators and filter to form an organic fertilizer.

SUMMARY OF THE INVENTION

An object of the present invention is to provide a fertilizer for plant having a remarkably superior fertilizing effect from the body, particularly heads of fish such as bonitoes and others.

In order to attain the above object, the present invention is characterized in a method of producing an organic fertilizer consisting of fish such as bonitoes and others by boiling the fish to obtain a stock containing active components, removing solids and oil contents from the stock to obtain a stock solution, thereafter treating the stock solution in a decomposition tank for enzyme decomposition, solid-liquid separating the enzyme-decomposed stock solution to a liquid content and a solid content if necessary, and filtering the liquid content to form a clarified liquid more preferably condensing the filtered clarified liquid or further drying it.

In a preferred embodiment of the invention, a starting material may be prepared first by cutting the head and other portions from fish such as bonitoes and others, and boiling the head and the other portions only to obtain a stock containing active components. Then, solids and oil contents are removed from the boiled stock to obtain a stock solution and this stock solution is supplied to a decomposition tank to treat it by enzyme decomposition.

In the aforementioned enzyme-decomposition step, enzyme decomposition may be carried out by adding one or more than two protein decomposing enzyme, fat decomposing enzyme and the like to the stock solution in the decomposition tank. A preferred decomposing enzyme used in the decomposition tank is a bacterial protein decomposing enzyme, such as NEOVITALASE SUPER (which is a trade name manufactured by Towa Koso in Japan). With the use of the aforementioned enzyme, gelatin and protein are rapidly decomposed in the stock solution, and a separation operation in a filter can easily be carried out.

Enzyme decomposition in the decomposition tank is carried out by increasing a temperature of the stock solution to about 50°–60° C., and keeping it for about 30 minutes to 3 hours, preferably 1–2 hours, and after decomposition, the temperature is raised to higher than 95° C. to deactivate the decomposing enzyme.

The stock solution enzyme-decomposed as described above is separated into a solid content and a liquid content and then the separated liquid content is filtered to form a clarified liquid. The solid-liquid separation may be carried out by separating means such as an oscillating sieve, a centrifugal separator, an oil separator and the like. It is preferable to carry out the separation by combining one or more than two of the separating means. However, sometimes it is not necessary to carry out the solid-liquid separation according to the decomposition condition.

Moreover, in order to regulate the salt content concentration of a final product at the first stage or the latter stage of a filter, it is preferable to employ a salt content removing step.

The filter removes fine particles and the like by passing the liquid content after solid-liquid separation through a filtering film of the filter such as a filter press and the like, thereby obtaining the organic fertilizer as a clarified liquid.

The clarified liquid taken out of the filter can be used as a fertilizer as is, but it may be further treated to condense the clarified liquid to extract, and then dry it to a dried product which can be used as a fertilizer.

In addition, if a filtrate is vigorously foamed in the step of taking it from the filter, an antifoamer may be sometimes added into the filtrate.

BRIEF DESCRIPTION OF THE DRAWINGS

FIG. 1 is a graph showing the results of a pollen tube growth test by fertilizing with the fertilizer of the present invention; and FIG. 2 is a graph showing the results of a pollen tube growth test by fertilizing the prior fertilizer extracted from the whole fish body.

DETAILED DESCRIPTION OF THE INVENTION

An example of the present invention will be described.

More than 80% of the heads of bonitoes were boiled as raw material, and then separated into a solid and a stock liquid with the use of an oscillating sieve, a centrifugal separator, an oil separator and a strainer to prepare a stock liquid. After the oil content was further removed from the separated stock liquid, the stock liquid was fed into a decomposition tank and decomposing enzyme was added thereto.

The temperature within the decomposition tank was raised to 60° C. maintained for 3 hours, thereafter raised to about 95° C., to deactivate the decomposing enzyme.

Next, a decomposed stock liquid was again solid-liquid separated by a separator, thereafter the liquid content was filtered by a filter press to prepare a clarified liquid, and the clarified liquid was vacuum condensed to make the water content of the condensed liquid less than 40%.

The thus obtained condensed liquid was good in preservation and decomposition resistance, and remarkably effective as an organic fertilizer.

The amino acid composition of the thus obtained organic fertilizer was measured by an amino acid automatic analyzer and shown in Table 1.

Moreover, nucleic acid was measured by a constrain liquid chromatograph method.

Furthermore, the water content was measured by a 105° C. constant weight drying method, and protein was measured by a Kjeldahl method.

TABLE 1

| amino acid | test result | detection limit |
|---|---|---|
| isoleucine | 1.06% | 0.01% |
| leucine | 2.60% | 0.01% |
| lysine | 3.29% | 0.01% |
| methionine | 1.27% | 0.01% |
| cystine | 0.29% | 0.01% |
| phenylalanine | 1.11% | 0.01% |
| tyrosine | 0.43% | 0.01% |
| threonine | 2.09% | 0.01% |
| tryptophane | 0.09% | 0.01% |
| valine | 1.82% | 0.01% |
| arginine | 4.47% | 0.01% |
| histidine | 2.36% | 0.01% |
| alanine | 5.63% | 0.01% |
| aspartic acid | 3.97% | 0.01% |
| glutamic acid | 6.73% | 0.01% |
| glycine | 11.13% | 0.01% |
| proline | 3.99% | 0.01% |
| serine | 2.28% | 0.01% |
| guanylic acid | 142.1 mg % | 1 mg % |
| thymine | 171.1 mg % | 1 mg % |
| cytocine | 21.4 mg % | 1 mg % |
| uracil | 22.2 mg % | 1 mg % |
| water content | 0% | 0.1% |
| protein | 71.7% | 0.1% |

FIG. 1 is a result of a pollen tube growth test using a condensate manufactured by the above-described example according to the invention and using tea pollen, and FIG. 2 is a result of a pollen tube growth test by using a fertilizer described in an example of JP-A1 No. 63-260885 proposed by the present applicant and using tea pollen.

Pollen tube growth test

8% of sucrose, 1.2% of agar and 17 ppm of boron were mixed and regulated to a pH 5.5 by 0.1–0.01N of hydrochloric acid and sodium hydroxide, thereafter heated, solved, and solidified to manufacture a culture medium, tea pollen were floored at six places of the culture medium, the above-described fertilizer of the example of the present invention was diluted to concentrations of 1/10000, 1/5000, 1/1000, 1/500 and 1/100, and 50 μl thereof was injected in the culture medium at 25° C. for 2 weeks, and the growth condition of a pollen tube was measured.

While the fertilizer produced by the prior art described in the example of JP-A1 No. 63-260885 was diluted to concentrations of 1/10000, 1/5000, 1/2500 and 1/1000.

Respective results i.e. growth rate of pollen tubes were shown by an index in reference (100) to the growth of a pollen tube at the time of no addition.

As apparent from FIG. 1, the fertilizer of the example of the present invention could grow a pollen tube to more than 180% at concentrations of 1/10000 and 1/5000, while the conventional chemical fertilizer did not show any acceleration of the growth, and further an extract extracted from the whole bonito of example of the prior art was about less than 130% growth of a pollen tube as shown in FIG. 2.

It is therefore found that the organic fertilizer of the present invention gives good growth to plants as compared with the prior fertilizer or the fertilizer produced from the whole fish body by the method described in JP-A1 No. 63-260885.

As explained above, the present invention can efficiently manufacture a superior organic fertilizer for favorably growing plants by utilizing the head portion of fish such as bonitoes and others, and effectively utilizing amino acid, peptide, nucleic acid, protein contained therein and co-existing special effective components and the like.

What is claimed is:

1. A method of producing an organic fertilizer by using fish, said method comprising the steps of preparing a raw material containing more than 80% of fish heads, boiling the raw material to obtain a stock, removing solids and oil contents from the stock to obtain stock liquid, thereafter treating the stock liquid in a decomposition tank with decomposing enzyme for enzyme decomposition, filtering the enzyme-decomposed stock liquid to produce a clarified liquid organic fertilizer, and condensing the clarified liquid organic fertilizer to produce a condensed organic fertilizer.

2. The method as claimed in claim 1, further comprising the steps of drying the condensed organic fertilizer to produce a dried organic fertilizer.

3. An organic fertilizer produced by the method comprising the steps of preparing raw material containing more than 80% of fish heads, boiling the raw material to obtain a stock, removing solids and oil contents from the stock to obtain a stock liquid, thereafter treating the stock liquid in a decomposition tank with decomposing enzyme for enzyme decomposition, filtering the enzyme-decomposed stock liquid to form a clarified liquid organic fertilizer, and condensing the clarified liquid organic fertilizer to produce a condensed organic fertilizer.

* * * * *